May 16, 1939. B. T. INSLEY 2,158,326
INJECTION RATE CONTROL FOR FUEL PUMPS
Filed May 17, 1937 2 Sheets-Sheet 1

INVENTOR.
Birddine T. Insley.
BY Chas. E. Townsend.
ATTORNEY.

May 16, 1939.   B. T. INSLEY   2,158,326
INJECTION RATE CONTROL FOR FUEL PUMPS
Filed May 17, 1937   2 Sheets-Sheet 2

INVENTOR.
Birddine T. Insley
BY Chas. E. Townsend.
ATTORNEY.

Patented May 16, 1939

2,158,326

UNITED STATES PATENT OFFICE 2,158,326

INJECTION RATE CONTROL FOR FUEL PUMPS

Birddine T. Insley, San Francisco, Calif.

Application May 17, 1937, Serial No. 142,943

3 Claims. (Cl. 74—53)

This invention relates to a mechanism whereby the injection rate of the fuel delivered to the cylinders of an engine of the compression-ignition type may be controlled.

In the operation of internal combustion engines, particularly of the compression-ignition type, the rate of injection of fuel into the combustion chamber is an important factor, as it affects the degree of atomization and the final combustion obtained. It controls the rate of combustion, and at the same time raises or lowers the firing pressure. It provides better control of penetration of fuel into the combustion chamber at different engine speeds and loads; and furthermore, it permits a high rate of injection and better atomization of the fuel at slow speeds, as when starting or idling.

The object of the present invention is to generally improve and simplify the construction and operation of mechanisms whereby the rate of fuel injection or the velocity of the fuel through the spray nozzles may be controlled; to provide means whereby this may be accomplished in conjunction with a constant-stroke pump; to provide means for varying the velocity of the pump plunger during the discharge stroke while the engine is in operation; and further, to provide a mechanism for the purpose described which is interposed between the fuel cam and the tappet of the pump or the plunger proper.

The invention is shown by way of illustration in the accompanying drawings, in which Fig. 1 is a vertical cross-section of the mechanism taken on line I—I of Fig. 3;

Figure 1:
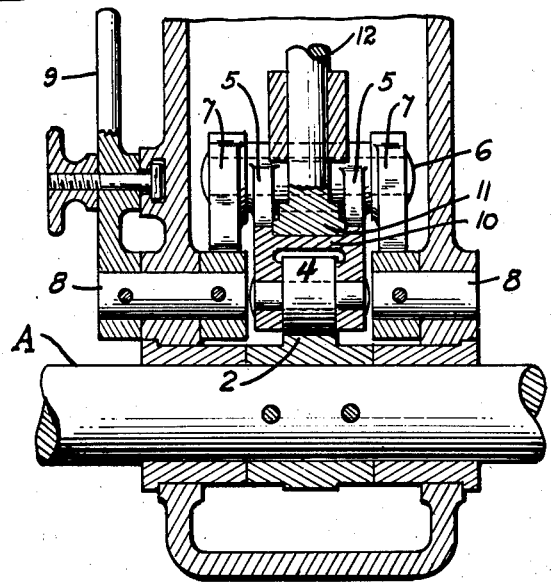
Figure 6:
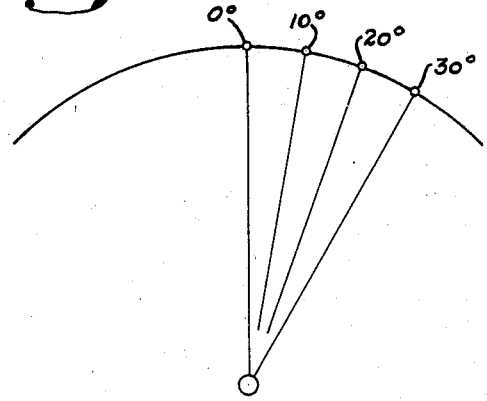
Fig. 6 is a diagrammatic view showing the upper portion or sweep of the crank pin of a crank shaft while approaching and passing top dead center.

For the purpose of briefly stating the purpose of the invention, reference will first be made to Fig. 6, which is a diagrammatic view illustrating the upper portion or sweep of the crank pin of a crank shaft while approaching and passing top dead center. In this view, 0 indicates the top dead center position of the piston and the crank, in an engine of the type referred to. The mechanism forming the subject matter of this application controls the rate or time in which any given quantity of fuel is injected into the cylinder. Let it be assumed that the quantity of fuel to be injected is one cubic inch. If that is the case, the fuel can be injected during the useful part of the cam lift during travel of the crank shaft from 0 to 10°, or from 0 to 20°, or from 0 to 30°, or at any point commencing at 0 and ceasing or ending at any point between 10° and 30°. In other words, a given quantity of fuel can be rapidly injected, for instance, between 0 and 10°, or the rate of injection may be prolonged to 20°, or up to 30°.

Referring to the drawings, and particularly to Figs. 1 to 5, A indicates the cam shaft of a Diesel or compression-ignition engine of the four-cycle type, and 2 indicates the fuel cam secured thereon. The flat face 3 is the lifting face of the cam, and this engages a cam follower in the form of a roller 4 journaled between the outer ends of a pair of arms 5 which are pivoted to a crank 6, said crank being secured between two arms 7—7, the inner ends of which are secured to a crank shaft indicated by the numerals 8—8, said crank shaft being provided with a lever 9 which may be manually or automatically controlled. The center of the crank shaft 8 is located on the same center as the roller 4 when this assumes what will hereinafter be termed its neutral position, said neutral position being substantially its lowermost position with relation to the heel of the fuel cam, or that position where uniform lift or velocity commences. In order to transmit motion from the roller to a tappet head 11, the outer ends of the arms 5 are connected by an arcuate shoe 10 which rubs against the lower face of the tappet head. This tappet head may be connected to any form of tappet 12, whereby the plunger of a fuel pump is actuated, or it may form a part of the plunger proper. It will be noted that the shoe 10 is curved, and that the curve is struck from the center of the roller 4, and that the lower face of the tappet head is curved, said curve being struck from a point located centrally of the cam shaft A. By arranging the shoe on the curve specified, and the lower face of the tappet on the curve struck from the center of the cam shaft, it is possible for the roller and shoe to assume different positions with relation to the tappet and the cam, without increasing or decreasing the lift of the cam; this being important, as the mechanism here shown is particularly intended for use in connection with fuel pumps of a constant stroke.

The crank 6 to which the arms 5 are pivotally attached is adapted to swing through the arc indicated at 6a, and it may swing over or through this arc between the points indicated at a and b, these points representing the limits of movement; but during actual operation, the crank 6 may be swung by means of the lever 9 to assume any intermediate position between these points.

Figure 2:
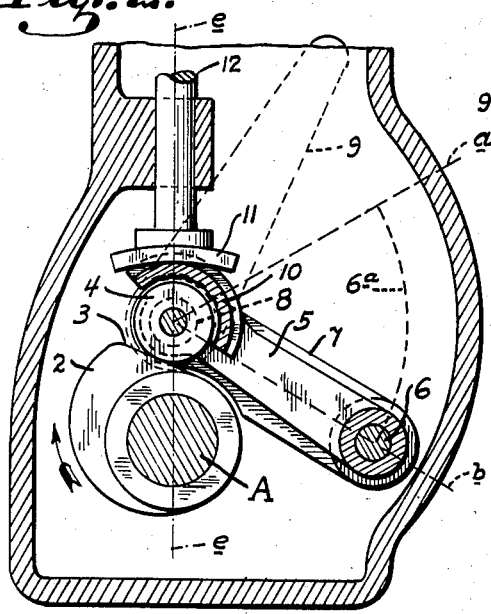
Fig. 2 is a side elevation in section showing the device set for injecting fuel over the greatest range of crankshaft travel, that is, from 0 to 30°.
Figure 3:
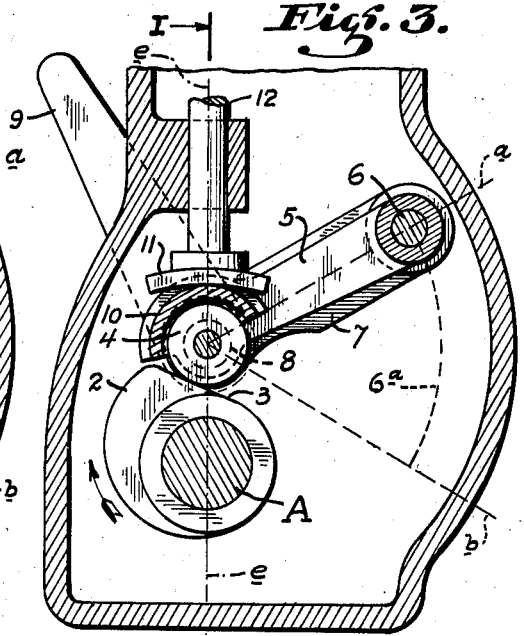
Fig. 3 is a section similar to Fig. 2, showing the device set for injecting the fuel in the shortest period of time, that is, between 0 and 10° of crankshaft travel.

It should be noted that the position of the roller 4, when in neutral as shown in Figs. 2 and 3, is in no way changed during the movement of the crank 6, as the center of the shaft 8 and of the roller 4 coincide in this position. The position of the roller when lifted from neutral to full raised position by means of the cam is, on the other hand, very materially changed, as shown in Figs. 4 and 5, and it is this change in position which determines the upward velocity of the pump plunger, or in other words the rate or speed with which the fuel is injected.

Figure 4:
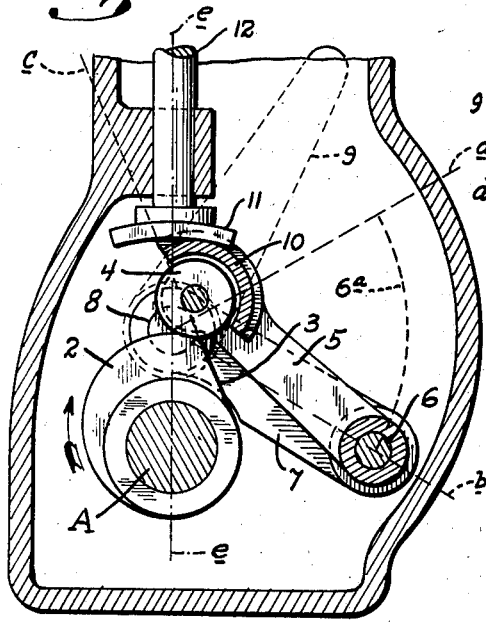
Fig. 4 is a view similar to Fig. 2, but showing the position of the lifting roller at the moment of maximum lift.
Figure 5:
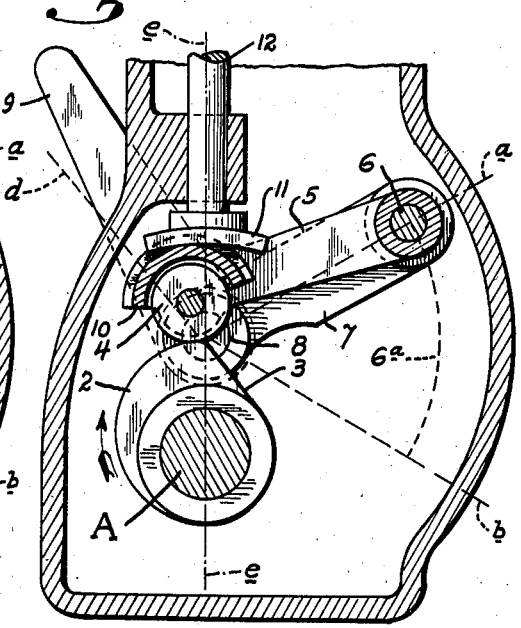
Fig. 5 is a view similar to Fig. 3, said view also showing the position of the lifting roller at the moment of maximum lift.

The longest period of injection, and consequently the slowest rate of injection, is obtained when the crank 6 assumes its lowermost position as shown in Figs. 2 and 4. This will readily be understood when it is noted that the roller 4, when raised by the fuel cam, swings about the crank 6 in the direction of travel of the cam, and as it swings with the cam, the cam will rotate a certain distance before the maximum lift of the roller is reached. On the other hand, if the crank 6 assumes the maximum raised position shown in Figs. 3 and 5, the roller 4 will swing towards the cam as it raises, and the travel of the cam will be less when maximum lift of the roller 4 is reached. In Fig. 4, the roller swings away from or to the right of a center line e—e drawn through the longitudinal axis of the tappet 12 and the center of the cam shaft A, while in Fig. 5, the roller swings towards the cam and away from the center line e—e, but to the left thereof. Stating it in another way: in Fig. 4 the lifting face of the cam is indicated by the dotted line c, and in Fig. 5 by the dotted line d. By referring to the two dotted line positions shown in Figs. 4 and 5, it is clearly seen that the fuel cam travels a greater distance in Fig. 4 than in Fig. 5, in order to lift the roller 4 to its uppermost position, and as the tappet or plunger 12 is actuated by the roller, the velocity of the plunger or the rate at which the fuel is injected may be controlled, or the time consumed to inject a given amount of fuel may be shortened or prolonged. Thus, while the position of the roller when in its lowermost or neutral position does not change by adjustment of the crank 6, the position of the roller does materially change when it is raised by the cam, as in one instance, such as shown in Fig. 4, it swings about the crank 6 in an arc which moves away from a center line drawn through the cam shaft and the longitudinal axis of the tappet, and to the right thereof; while in Fig. 5, the roller swings in an arc which causes the roller while it is being raised to again swing away from the center line just specified, but in a direction opposite, and to the left thereof; and as the cam always travels in a clockwise direction, the roller and the tappet are bound to reach their uppermost position in the least period of time when adjusted to the position shown in Fig. 5, and will require a greater period of time to assume the uppermost position when assuming the position shown in Fig. 4. It is thus that the fuel-injecting period is shortened or prolonged, or in other words, that the velocity of the plunger or rate at which the fuel is injected is controlled.

The mechanism here illustrated permits complete injection of a given quantity of fuel during 5° of cam shaft travel, or, in other words, during 10° of crank shaft travel; or the time of injection may be prolonged to 15° of cam shaft, or 30° of crank shaft, travel, it being understood that the fuel may be completely injected at any point intermediate 15° and 30°, by proper adjustment of the crank 6, through means of the controlling lever 9. This lever may be manually controlled or adjusted during engine operation, or it may be automatically adjusted, as for instance by being connected with a governor or any other suitable controlling mechanism.

The present drawings indicate a cam profile of customary commercial practice, as this has been found to give the best average performance for varying speeds and loads. The cam, however, should preferably be provided with a face giving constant acceleration during the fuel injection, and should cooperate with a fuel pump of the constant stroke type. Any standard type of fuel metering control may be employed, and any suitable form of device for advancing or retarding the point of fuel injection may similarly be employed. While the mechanism has been described in conjunction with an engine of the four-cycle type, it is obviously equally applicable to an engine of the two-cycle type; the only change necessary would be to change the cam accordingly. The injection period of 0 to 30° of crank shaft travel is merely illustrative; it may be more or less.

While certain features of the invention have been more or less specifically described and illustrated, I nevertheless wish it understood that changes may be resorted to within the scope of the appended claims, and that the materials and finish of the several parts employed may be such as the experience and judgment of the manufacturer may dictate.

Having thus described my invention, what I claim and desire to secure by Letters Patent is as follows:

1. The combination with a rotatable fuel cam and the tappet of a fuel pump, of a cam follower actuated by the fuel cam; means carried by the follower for imparting reciprocal movement to the tappet; an arm supporting the follower at its inner end; an adjustable support for the outer end of the arm, said follower normally assuming a predetermined neutral position with relation to the cam when in its lowermost position; a pivot for the adjustable support, said pivot being located substantially at the same point as the center of the follower when in its neutral position; and means for swinging the support and the outer end of the follower supporting arm about said pivot whereby the follower when raised by the cam will move from its neutral position to a full lift position within a greater or lesser period of time at any given engine speed.

2. The combination with the fuel cam and the tappet of a fuel pump of a cam follower interposed between the cam and the tappet, and actuated by the cam; an arm on which said follower is carried; a pivotal support for the opposite end of the arm, about which the arm and follower swing when raised by the cam, said pivotal support being disposed at the outer end of a crank arm, and said crank arm being rotatable about a center which coincides with the center of the follower when this assumes substantially its lowermost position with relation to the cam; and means for swinging the crank to change the position of the pivotal support carried thereby, whereby the follower and arm may swing to one side or another of a center line drawn through the longitudinal axis of the tappet and the center of revolution of the cam.

3. The combination with the fuel cam and the tappet of a fuel pump of a roller interposed between the cam and the tappet, and actuated by the cam; an arm on which said roller is journaled; a pivotal support for the opposite end of the arm, about which the arm and roller swing when raised by the cam, said pivotal support being disposed at the outer end of a crank arm, and said crank arm being rotatable about a center which coincides with the center of the roller when this assumes substantially its lowermost position with relation to the cam; and means for swinging the crank to change the position of the pivotal support carried thereby.

BIRDDINE T. INSLEY.